(12) United States Patent
Ishii et al.

(10) Patent No.: US 6,172,982 B1
(45) Date of Patent: Jan. 9, 2001

(54) COMMUNICATION CONTROL SYSTEM AND METHOD OF CONTROLLING COMMUNICATION

(75) Inventors: Kenichi Ishii; Tomoki Osawa, both of Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/028,812

(22) Filed: Feb. 24, 1998

(30) Foreign Application Priority Data

Feb. 25, 1997 (JP) .................................................... 9-040782

(51) Int. Cl.[7] .............................. H04L 12/50; H04L 12/28
(52) U.S. Cl. ............................ 370/401; 370/338; 370/402
(58) Field of Search .................................... 370/338, 401, 370/402, 331, 332; 455/432, 433, 435

(56) References Cited

U.S. PATENT DOCUMENTS

| | | | | |
|---|---|---|---|---|
| 4,308,429 | * | 12/1981 | Kai et al. | 455/439 |
| 5,029,183 | * | 7/1991 | Tymes | 375/206 |
| 5,371,738 | * | 12/1994 | Moelard et al. | 370/331 |
| 5,504,746 | * | 4/1996 | Meier | 370/256 |
| 5,796,727 | * | 8/1998 | Harrison et al. | 370/338 |
| 5,822,361 | * | 10/1998 | Nakamura et al. | 375/202 |
| 5,848,064 | * | 12/1998 | Cowan | 370/338 |
| 5,873,031 | * | 2/1999 | Griffith et al. | 455/412 |
| 6,038,458 | * | 3/2000 | Siira | 455/560 |
| 6,078,575 | * | 6/2000 | Dommety et al. | 370/338 |
| 6,084,867 | * | 7/2000 | Meier | 370/338 |

FOREIGN PATENT DOCUMENTS 2-140034   5/1990   (JP) .

OTHER PUBLICATIONS

C. Perkins, "IP Mobility Support", RFC2002, Oct. 1996.

* cited by examiner

*Primary Examiner*—Chi H. Pham
*Assistant Examiner*—Brenda H. Pham
(74) *Attorney, Agent, or Firm*—Sughrue, Mion, Zinn, Macpeak & Seas, PLLC

(57) ABSTRACT

A communication control system in a packet communication network having a plurality of radio sub-networks, the radio sub-networks being connected to a wired sub-network by learning type bridges, respectively, the system including a radio terminal for communicating with the radio sub-networks, the radio terminal including first means for detecting whether or not the terminal moves from one of the radio sub-networks to other radio sub-networks, and second means for transmitting a dummy packet when movement between the radio sub-networks is detected.

20 Claims, 4 Drawing Sheets

COMMUNICATION CONTROL SYSTEM AND METHOD OF CONTROLLING COMMUNICATION

BACKGROUND OF THE INVENTION

The present invention relates to a communication control system used in a packet communication network and a method of controlling communication in the packet communication network in which a wired sub-network and a plurality of radio sub-networks are connected by learning type bridges.

Generally, in a packet communication network having a plurality of sub-networks, it is known to, when connecting sub-networks to each other, connect them using a bridge apparatus having a learning function (for example, JP-A-140034/1990).

In such a bridge system, a bridge apparatus has a learning table, a bridge for performing a relay of a packet registers a source address included in the packet and a received sub-network number in the learning table, and when a destination address included in the packet is registered in the learning table, the bridge transmits the packet to the registered sub-network. However, in case that the registered sub-network is a sub-network that has received the packet, the packet is discarded.

On the other hand, when the destination address is not registered in the learning table, the packet is simultaneously transmitted to all sub-networks connected to the bridge.

In case that the packet is not transmitted in a predetermined time interval from a terminal having a corresponding address, a set of the address and sub-network that are registered in the learning table is deleted due to out of time.

By means of the bridge system having such a learning function, simultaneous transmission of the packet to the sub-networks in which terminals do not exist (are not located) can be reduced and it become to be easy to structure a large scale network.

By the way, in the network in which a wired sub-network and a plurality of radio sub-networks are connected using the above-described bridge, in case that a terminal connected to, or located in one radio sub-network and conducting communication moves to other radio sub-networks, since an address of the terminal is registered together with the wired sub-network number in the bridge connecting the radio sub-network to which the terminal moves, to the wired sub-network, the packet transmitted to the terminal is not transmitted to a side of the radio sub-networks. And then, if the terminal that has moved (the said terminal) transmits the packet and the learning table is changed or if the set of the address and sub-network is deleted from the learning table due to out of time as mentioned above, the bridge becomes to start transmission of the packet transmitted to the terminal, to the side of the radio sub-network.

In the above-mentioned bridge system, when the terminal connected to one radio sub-network and conducting communication moves to other radio sub-networks, if the contents of the learning table of the bridge are not changed or deleted, the packet transmitted to the terminal is not transmitted to the side of the radio sub-networks, and as a result, there is a problem that reconnection during movement of the terminal needs time.

SUMMARY OF THE INVENTION

The objective of the present invention is to provide a communication control system and a method of controlling communication in a packet communication network that are capable of conducting the reconnection for a short time during the movement of the terminal.

The objective of the present invention is achieved by a communication control system in a packet communication network having a plurality of radio sub-networks. The radio sub-networks are connected to a wired sub-network by learning type bridges, respectively. The communication control system includes a radio terminal for communicating with the radio sub-networks, and the radio terminal includes first means for detecting whether or not the terminal moves from one of the radio sub-networks to other radio sub-networks, and second means for transmitting a dummy packet when movement between the radio sub-networks is detected.

In accordance with present invention, the dummy packet is a packet that does not need a response packet.

Moreover, for example, the learning type bridges include transmission means for transmitting a control packet to the sub-networks on a radio side, which includes sub-network discriminating signals that are different for each of the learning type bridges, and the first means detects the movement between the radio sub-networks when the sub-network discriminating signals included in a received control packet are different from a previously received sub-network discriminating signals.

Also, the first means is adapted to detect movement between the radio sub-networks when a registration discriminating signal is not registered in the radio terminal.

Further, in case that each of the radio sub-networks uses radio channels that are different from each other, the radio terminal selects the radio channels in accordance with a predetermined radio channel selecting procedure and the first means detects the movement between the radio sub-networks when the radio channels are different from each other.

The objective of the present invention is also achieved by a method of controlling communication in a packet communication network is provided, in which the packet communication network has a plurality of radio sub-networks, the radio sub-networks are connected to a wired sub-network by learning type bridges, respectively, and packet communication network includes a radio terminal for communicating with said radio sub-networks. The method includes steps of detecting whether or not the radio terminal moves from one of the radio sub-networks to other radio sub-networks, and transmitting a dummy packet when movement of the radio terminal between the radio sub-networks is detected.

In this manner, according to the present invention, since the radio terminal (mobile terminal) transmits the dummy packet for changing the learning table of the bridge when the radio terminal detects the movement between the radio sub-networks, it is possible to reduce time necessary for the reconnection, and as a result, to mitigate a packet loss.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
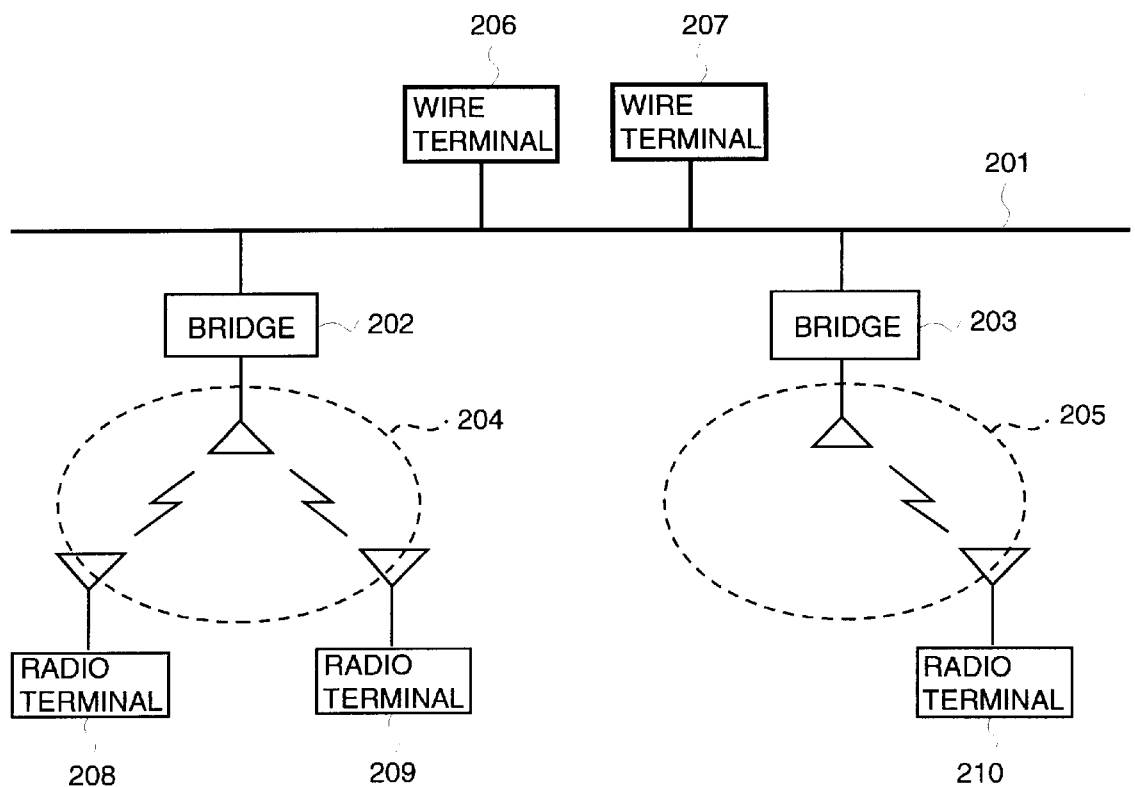
FIG. 1 is a block diagram showing an example of a network in which a communication control system in accordance with the present invention is used.

The present invention will be explained below referring to Figures.

First, referring to FIG. 1, a packet communication network (simply referred to as a network, hereinafter) as shown in the Figure has a wired sub-network 201 and a plurality of radio sub-networks 204 and 205, and the radio sub-networks 204 and 205 are connected to the wired sub-network 201 by bridges 202 and 203, respectively.

In an example shown in the Figure, wire terminals 206 and 207 are connected to the wired sub-network and radio terminals 208 and 209 are connected to (located in) the radio sub-network 204. Similarly, a radio terminal 210 is connected to (located in) the radio sub-network 205.

Figure 2:
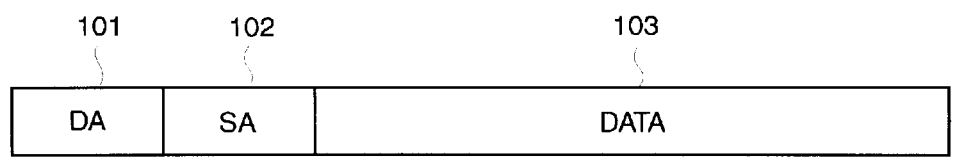
FIG. 2 is a view showing an example of a transmission packet used in the network shown in FIG. 1.

Referring to FIG. 2 here, in FIG. 2, an example of a packet transmitted from each terminal is shown, and when transmitting the packet, each terminal transmits a packet having a sub-network address (DA) 101 of a terminal to which the packet is transmitted, a sub-network address (SA) 102 of its own station from which the packet is transmitted and a transmission data (DATA) 103.

Referring to FIG. 1 again, each of the bridges 202 and 203 has learning tables (not shown), respectively, and a set of the sub-network address (SA) from which the packet is transmitted and the sub-network is registered in the learning tables. And also, in each of the bridges 202 and 203, in case that the terminal connected to each sub-network conducts communication,, the learning tables are updated.

Figure 3:
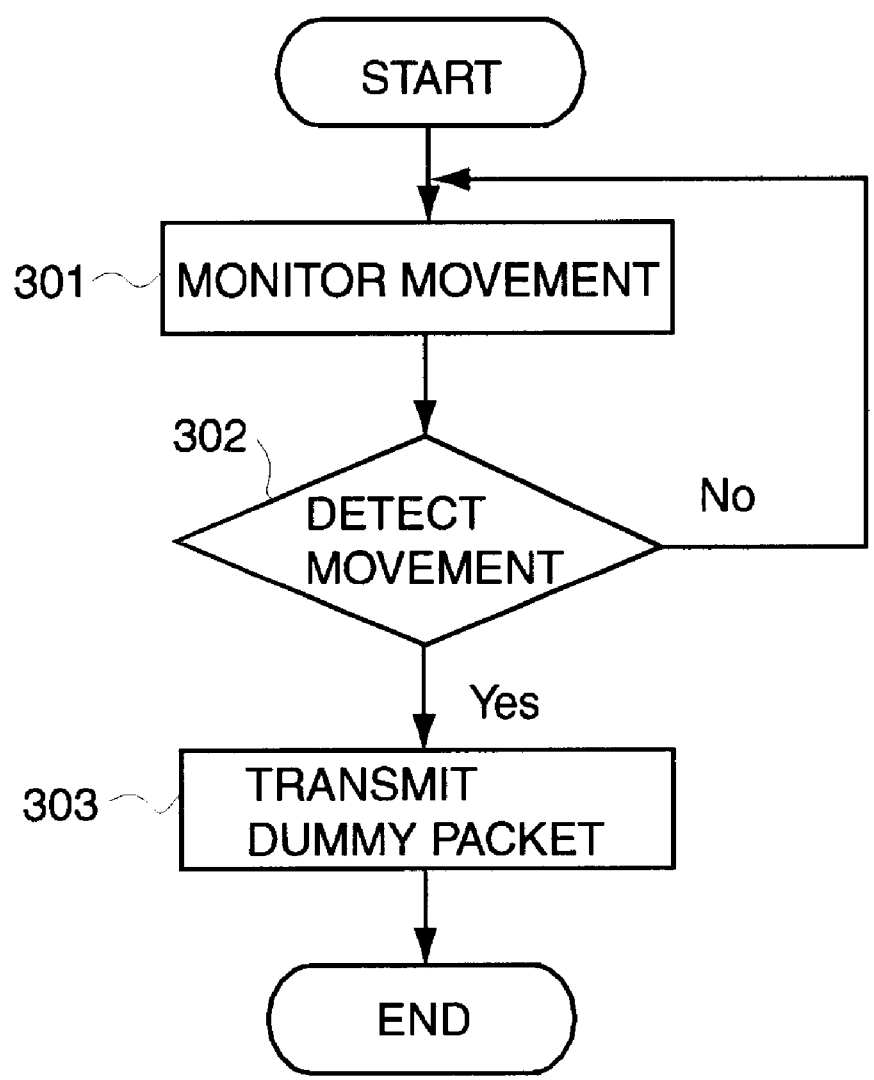
FIG. 3 is a flowchart for explaining an embodiment of the communication control system in accordance with the present invention.

Referring FIG. 1 to FIG. 3, each radio terminal monitors the movement between the radio sub-networks in its own station (step 301), and if the movement between the radio sub-networks is detected (step 302), each radio terminal transmits a dummy packet that does not need a response packet (step 303). As the dummy packet, it is possible to use Gratuitous ARP and so forth shown in a document (C. Perkins, "IP Mobility Support", RFC2002, October 1996) and so forth.

In this manner, since, when the radio terminal moves between the radio sub-networks, the radio terminal is adapted to transmit the dummy packet that does not need the response packet, the contents of the learning tables of the bridges are changed, and as a result, the bridges become to transmit to a side of the radio sub-networks a packet which is transmitted to the radio terminal. In other words, since, when the radio terminal moves between the radio sub-networks, the radio terminal is adapted to transmit the dummy packet that does not need the response packet, reconnection can be conducted for a short time.

Figure 4:
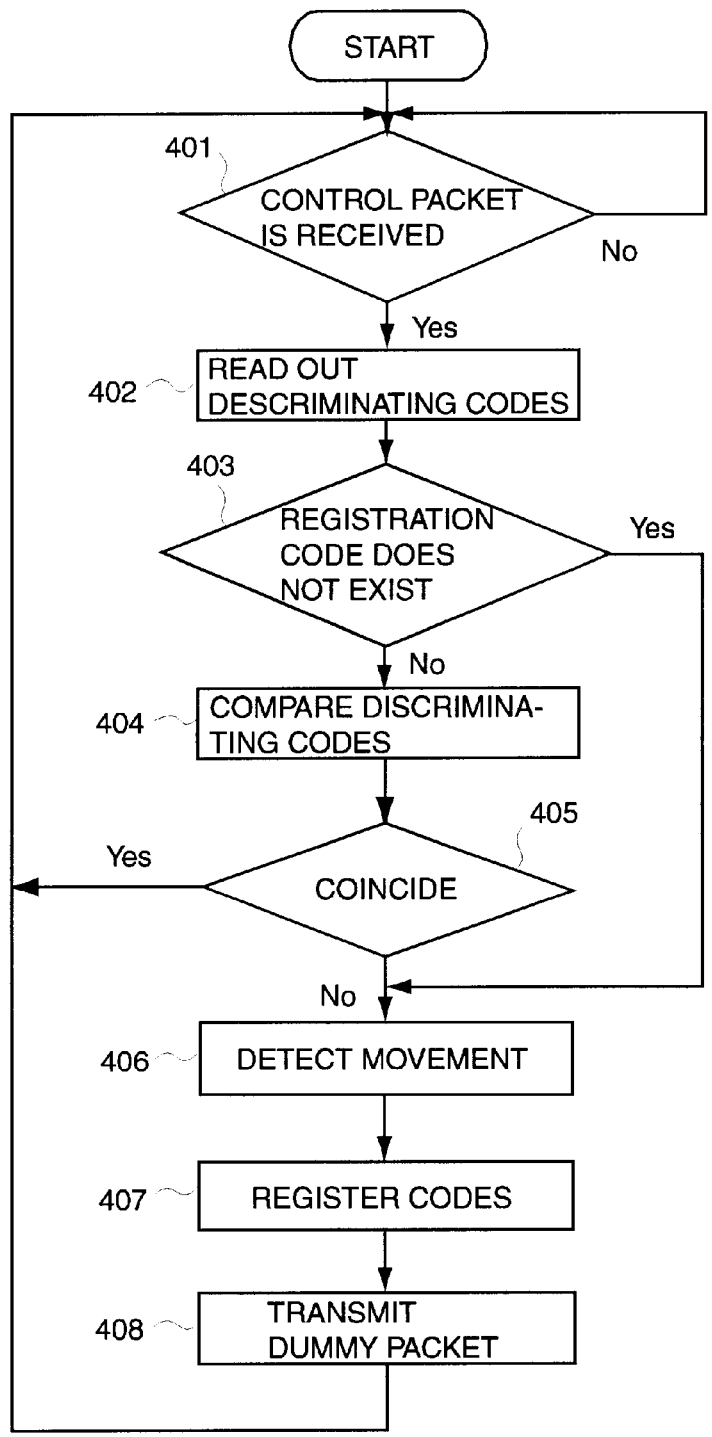
FIG. 4 is a flowchart for explaining other embodiment of the communication control system in accordance with the present invention.

Referring FIG. 1, FIG. 2 and FIG. 4, in an embodiment shown in FIG. 4, sub-network discriminating codes that are different from each other are provided with each bridge, and if movement is detected at the radio terminal when a control packet including the discriminating codes is transmitted to the side of the radio sub-networks every predetermined period, a dummy packet is transmitted. Particularly, if the radio terminal receives the control packet (step 401), the radio terminal reads out sub-network discriminating codes included in the control packet (step 402). If a registration discriminating code is registered in the radio terminal (step 403), the sub-network discriminating codes and the registration discriminating code are compared with each other in the radio terminal (step 404).

As a result of the comparison, if the registration discriminating code and the sub-network discriminating codes coincide with each other (step 405), the radio terminal becomes to wait reception of the control packet.

On the other hand, if the registration discriminating code is not registered at the step 403 or if it is determined at the step 405 that the registration discriminating code and received discriminating codes (sub-network discriminating codes) are different from each other, the radio terminal determines that it has moved to other (different) radio sub-networks. In other words, the radio terminal detects the movement between the radio sub-networks (step 406). And then, the radio terminal newly registers the received discriminating codes therein (step 407) and transmits the dummy packet (step 408).

Also in this embodiment, since, when the radio terminal moves between the radio sub-networks, the radio terminal is adapted to transmit the dummy packet, the reconnection can be conducted for a short time.

Figure 5:
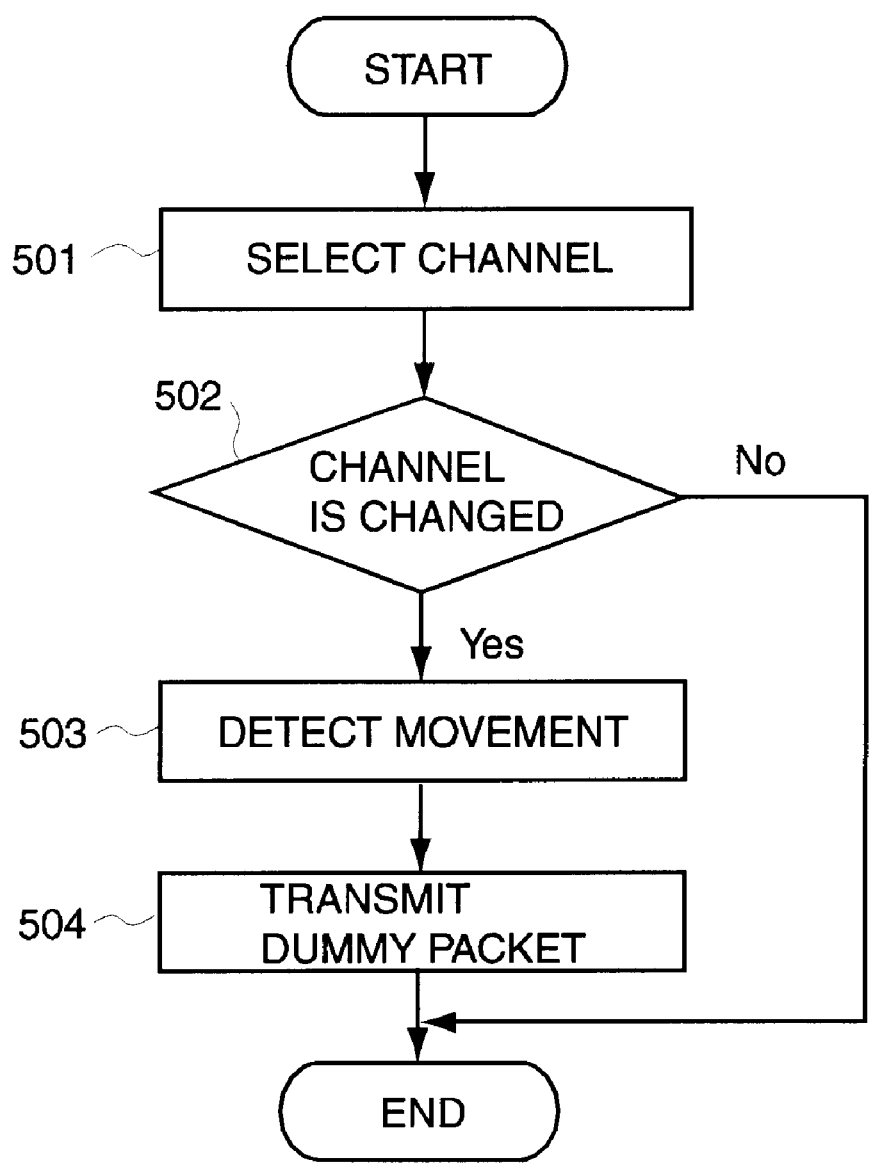
FIG. 5 is a flowchart for explaining still other embodiment of the communication control system in accordance with the present invention.

Referring FIG. 1, FIG. 2 and FIG. 5, in an embodiment shown in FIG. 5, in case that the bridge connecting each radio sub-network to the wired sub-network selects one channel from a plurality of radio channels in accordance with a predetermined channel selecting method and is using the selected channel, the radio terminal selects the radio channel in accordance with the above-described channel selecting method and transmits the dummy packet to the radio sub-network to which the radio terminal moves, when the radio terminal moves between the radio sub-networks (It is noted that the above-described channel selecting method is described in JP-Application-214556-1996, for example.).

Particularly, when the radio terminal moves between the radio sub-networks using the radio channels that are different from each other, the radio terminal selects, for example by means of the above-described channel selecting method, the channel being used in the radio sub-network to which the radio terminal moves (step 501). If the radio terminal moves between the radio sub-networks, the radio channel is changed in accordance with a processing result of a radio channel selecting process (step 502). In other words, the radio terminal determines whether or not the radio channel has been changed (step 502), and the radio terminal detects the movement between the radio sub-networks of which the radio channel is changed (step 503). And then, when the radio terminal detects the movement between the radio sub-networks, it transmits a dummy packet (step 504).

Also in this embodiment, since, when the radio terminal moves between the radio sub-networks, the radio terminal is adapted to transmit the dummy packet, the reconnection can be conducted for a short time.

In addition, when the radio terminal moves between the radio sub-networks using the same radio channels, it is possible to detect the movement of the radio terminal by the above-mentioned process explained in the FIG. 4. And also, by combining the process explained in FIG. 4 with the process explained in FIG. 5, it is possible to detect the movement of the radio terminal also in the network in which a plurality of radio channels are used.

As explained above, in the present invention, since, when the mobile terminal (radio terminal) detects the movement between the radio sub-networks, the radio terminal is adapted to transmit the dummy packet to the radio sub-network to which the radio terminal moves, the present invention effects that it is possible to shorten the time necessary for the reconnection, and it is possible to reduce the packet loss.

The entire disclosure of Japanese Patent Application No. 9-040782 filed on Feb. 25, 1997 including specification, claims, drawing and summary are incorporated herein by reference in its entirety.

What is claimed is:

1. A communication control system in a packet communication network having a plurality of radio sub-networks, said radio sub-networks being connected to a wired sub-network by learning type bridges, respectively, said system comprising:

a radio terminal for communicating with said radio sub-networks, said radio terminal including:

first means for detecting whether or not said radio terminal moves from one of said radio sub-networks to other radio sub-networks; and second means for transmitting a dummy packet when movement between said radio sub-networks is detected.

2. The communication control system according to claim 1, wherein said dummy packet is a packet that does not need a response packet.

3. The communication control system according to claim 1, wherein said learning type bridges comprise transmission means for transmitting a control packet to said sub-networks on a radio side, said control packet including sub-network discriminating signals that are different for each of said learning type bridges, and said first means is adapted to detect movement between said radio sub-networks when said sub-network discriminating signals included in a received control packet are different from a previously received sub-network discriminating signals.

4. The communication control system according to claim 2, wherein said learning type bridges comprise transmission means for transmitting a control packet to said sub-networks on a radio side, said control packet including sub-network discriminating signals that are different for each of said learning type bridges, and said first means is adapted to detect movement between said radio sub-networks when said sub-network discriminating signals included in a received control packet are different from a previously received sub-network discriminating signals.

5. The communication control system according to claim 1, wherein said first means is adapted to detect movement between said radio sub-networks when a registration discriminating signal is not registered in said radio terminal.

6. The communication control system according to claim 2, wherein said first means is adapted to detect movement between said radio sub-networks when a registration discriminating signal is not registered in said radio terminal.

7. The communication control system according to claim 1, wherein each of said radio sub-networks uses radio channels that are different from each other, said radio terminal selects said radio channels in accordance with a predetermined radio channel selecting procedure, and said first means is adapted to detect movement between said radio sub-networks when said radio channels are different from each other.

8. The communication control system according to claim 2, wherein each of said radio sub-networks uses radio channels that are different from each other, said radio terminal selects said radio channels in accordance with a predetermined radio channel selecting procedure, and said first means is adapted to detect movement between said radio sub-networks when said radio channels are different from each other.

9. The communication control system according to claim 3, wherein each of said radio sub-networks uses radio channels that are different from each other, said radio terminal selects said radio channels in accordance with a predetermined radio channel selecting procedure, and said first means is adapted to detect movement between said radio sub-networks when said radio channels are different from each other.

10. The communication control system according to claim 4, wherein each of said radio sub-networks uses radio channels that are different from each other, said radio terminal selects said radio channels in accordance with a predetermined radio channel selecting procedure, and said first means is adapted to detect movement between said radio sub-networks when said radio channels are different from each other.

11. A method of controlling communication in a packet communication network having a plurality of radio sub-networks, said radio sub-networks being connected to a wired sub-network by learning type bridges, respectively, said packet communication network comprising a radio terminal for communicating with said radio sub-networks, said method comprising steps of:

detecting whether or not said radio terminal moves from one of said radio sub-networks to other radio sub-networks; and transmitting a dummy packet when movement of said radio terminal between said radio sub-networks is detected.

12. The method of controlling communication according to claim 11, wherein said dummy packet is a packet that does not need a response packet.

13. The method of controlling communication according to claim 11, wherein before said detecting step, said method further comprises a step of transmitting a control packet to said sub-networks on a radio side, said control packet including sub-network discriminating signals that are different for each of said learning type bridges, and said detecting step includes a step of detecting movement of said radio terminal between said radio sub-networks when said sub-network discriminating signals included in a received control packet are different from a previously received sub-network discriminating signals.

14. The method of controlling communication according to claim 12, wherein before said detecting step, said method further comprises a step of transmitting a control packet to said sub-networks on a radio side, said control packet including sub-network discriminating signals that are different for each of said learning type bridges, and said detecting step includes a step of detecting movement of said radio terminal between said radio sub-networks when said sub-network discriminating signals included in a received control packet are different from a previously received sub-network discriminating signals.

15. The method of controlling communication according to claim 11, wherein said detecting step includes a step of detecting movement of said radio terminal between said radio sub-networks when a registration discriminating signal is not registered in said radio terminal.

16. The method of controlling communication according to claim 12, wherein said detecting step includes a step of detecting movement of said radio terminal between said radio sub-networks when a registration discriminating signal is not registered in said radio terminal.

17. The method of controlling communication according to claim 11, wherein each of said radio sub-networks uses radio channels that are different from each other, said radio terminal selects said radio channels in accordance with a predetermined radio channel selecting procedure, and said detecting step includes of a step of detecting movement of said radio terminal between said radio sub-networks when said radio channels are different from each other.

18. The method of controlling communication according to claim 12, wherein each of said radio sub-networks uses radio channels that are different from each other, said radio terminal selects said radio channels in accordance with a predetermined radio channel selecting procedure, and said detecting step includes a step of detecting movement of said radio terminal between said radio sub-networks when said radio channels are different from each other.

19. The method of controlling communication according to claim 13, wherein each of said radio sub-networks uses radio channels that are different from each other, said radio terminal selects said radio channels in accordance with a predetermined radio channel selecting procedure, and said detecting step includes a step of detecting movement of said radio terminal between said radio sub-networks when said radio channels are different from each other.

20. The method of controlling communication according to claim 14, wherein each of said radio sub-networks uses radio channels that are different from each other, said radio terminal selects said radio channels in accordance with a predetermined radio channel selecting procedure, and said detecting step includes a step of detecting movement of said radio terminal between said radio sub-networks when said radio channels are different from each other.

\* \* \* \* \*